United States Patent [19]

Massey

[11] 4,051,968

[45] Oct. 4, 1977

[54] LOAD HANDLING METHOD AND APPARATUS

[76] Inventor: Navarre Andre Massey, P.O. Box 850, 542 River Drive, Fort MacLeod, Alberta, Canada, T0L 0Z0

[21] Appl. No.: 671,416

[22] Filed: Mar. 29, 1976

[30] Foreign Application Priority Data

June 27, 1975 Canada .................................. 230360

[51] Int. Cl.$^2$ ............................................... B60P 1/14
[52] U.S. Cl. ................... 214/506; 214/152; 214/517; 280/80 B
[58] Field of Search ............ 214/505, 506, 85.5, 214/152, 517; 280/80 B; 298/21 V, 22 F

[56] References Cited

U.S. PATENT DOCUMENTS

| | | | |
|---|---|---|---|
| 3,624,786 | 11/1971 | Lundahl | 280/80 B X |
| 3,934,740 | 1/1976 | Rumell | 214/517 X |

*Primary Examiner*—Robert G. Sheridan

[57] ABSTRACT

Apparatus and method for loading and unloading flatbed trailers by means of a winch-driven cable attachable to the forward part of a slidably mounted wheel carriage assembly or, alternatively to the forward portion of a slidable load; the load and the wheel carriage assembly being connected by a linkage cable, so that actuation of the winch results in simultaneous movement of the wheel carriage assembly, and the load in opposite directions with reference to the longitudinal axis of the trailer.

15 Claims, 3 Drawing Figures

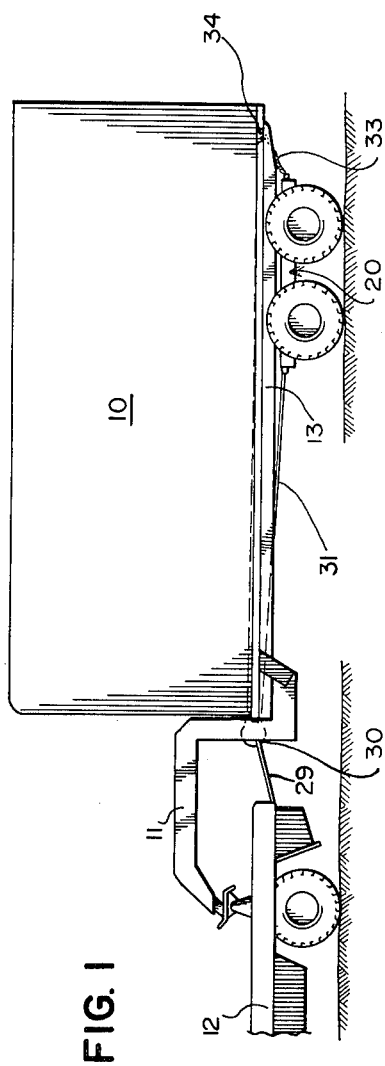
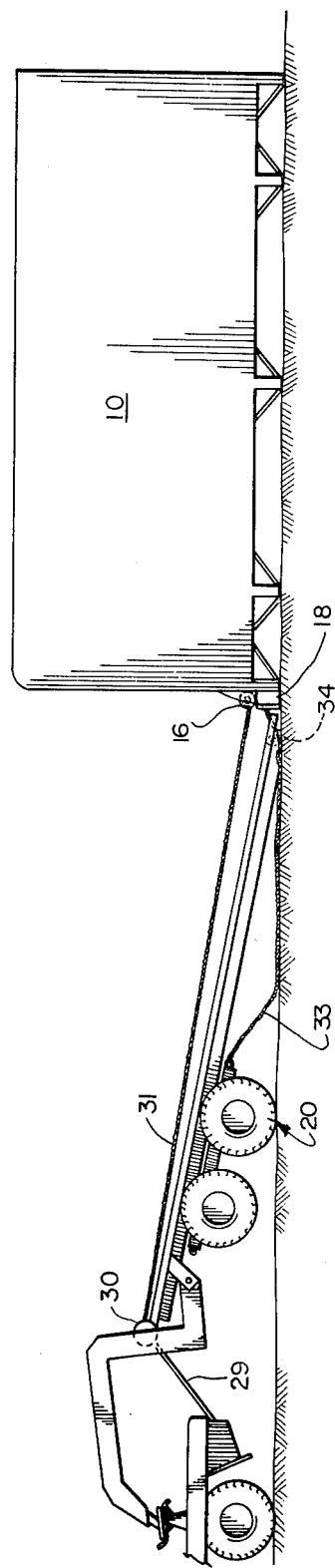

LOAD HANDLING METHOD AND APPARATUS

BACKGROUND OF THE INVENTION

The present invention relates to transport vehicles such as semi-trailers and in particular to semi-trailers adapted to haul containerized or palletized loads, and more particularly relates to a method of loading and unloading such vehicles and apparatus to facilitate loading and unloading.

The difficulties in loading and unloading of heavy loads on and off trailers in the absence of suitable loading platforms or where the height of a loading platform does not match that of the trailer are well known in the art. Several versions of tiltable trailers have been suggested in the past, none of which, however, combine the advantages of critical control of heavy loads during the loading and off-loading operation with simplicity and efficiency.

The present invention resides in an improvement in a flat bed trailer tiltably attachable to a hauling unit, comprising a flat bed platform provided, on its lower surface, with at least two longitudinal carriage guiderails, a moveable wheel carriage assembly provided with rollers which engage the said carriage guiderails, the improvement comprising: (1) a winch; (2) a winch cable engaged by the said winch and capable of being selectively connected to the forward lower edge of the said container or to the forward part of the said wheel carriage assembly; (3) a linkage cable, one end of which is capable of being connected to the forward lower edge of a load, while the other end is capable of being connected to the rear part of the said wheel carriage assembly; (4) an idler sheave located at the rear of the said flat bed trailer, adapted to accept and guide said linkage cable.

Thus, the present invention provides a trailer, the rear end of which may be lowered to match the height of a loading platform or even to ground level. To achieve this end, the bed of the trailer is a tiltable platform which can be tilted rearwardly by drawing the wheel carriage of the trailer forward with respect to the trailer bed. To facilitate loading and unloading and to assure better balance of the load on the tiltable trailer when the trailer is being tilted or returned to its normal horizontal position, the loading or off-loading of the load, i.e. a container, pallet, etc. is synchronous with the tilting movement of the trailer.

The present invention further provides a method of loading containers, pallets and similar loads onto flat bed trailers having a slidably mounted wheel carriage, comprising the steps of aligning the rear end of the trailer with the front end of the load, tilting the flat bed trailer rearward by moving the slidably mounted wheel carriage in the forward direction, attaching one end of a linkage cable to the rear part of the slidably mounted wheel carriage and attaching the other end of the linkage cable to the lower forward part of the load, attaching a winch cable to the lower forward part of the load, pulling the container or pallet forward and onto the tilted trailer bed by means of the winch cable while simultaneously drawing the slidably mounted wheel carriage rearward by means of the linkage cable.

The present invention further provides a method of unloading of containers, pallets or similar loads from flat bed trailers having slidably mounted wheel carriage assemblies, comprising the steps of attaching a winch cable to the forward part of the slidably mounted wheel carriage, attaching one end of a linkage cable to the rear part of the slidably mounted wheel carriage and attaching the other end of the linkage cable to the forward lower part of the load, drawing the slidably mounted wheel carriage forward by means of the winch cable, while the load is simultaneously drawn rearward by means of the linkage cable, resulting in the trailer bed being tilted rearward and the load sliding and being drawn off the trailer bed. After a part of the load comes into contact with, and to rest, on a load bearing surface, linkage cable is disconnected the tilted flat bed trailer driven foreard and from under the remainder of the load.

BRIEF DESCRIPTION OF THE DRAWINGS

The apparatus and method of the present invention can be best described by reference to the drawings, in which:

FIG. 1 is a side elevation showing a trailer-container assembly ready for unloading;

FIG. 2 is a side elevation showing a trailer and a container at the commencement of the loading procedure;

DESCRIPTION OF THE PREFERRED EMBODIMENTS

Figure 3:
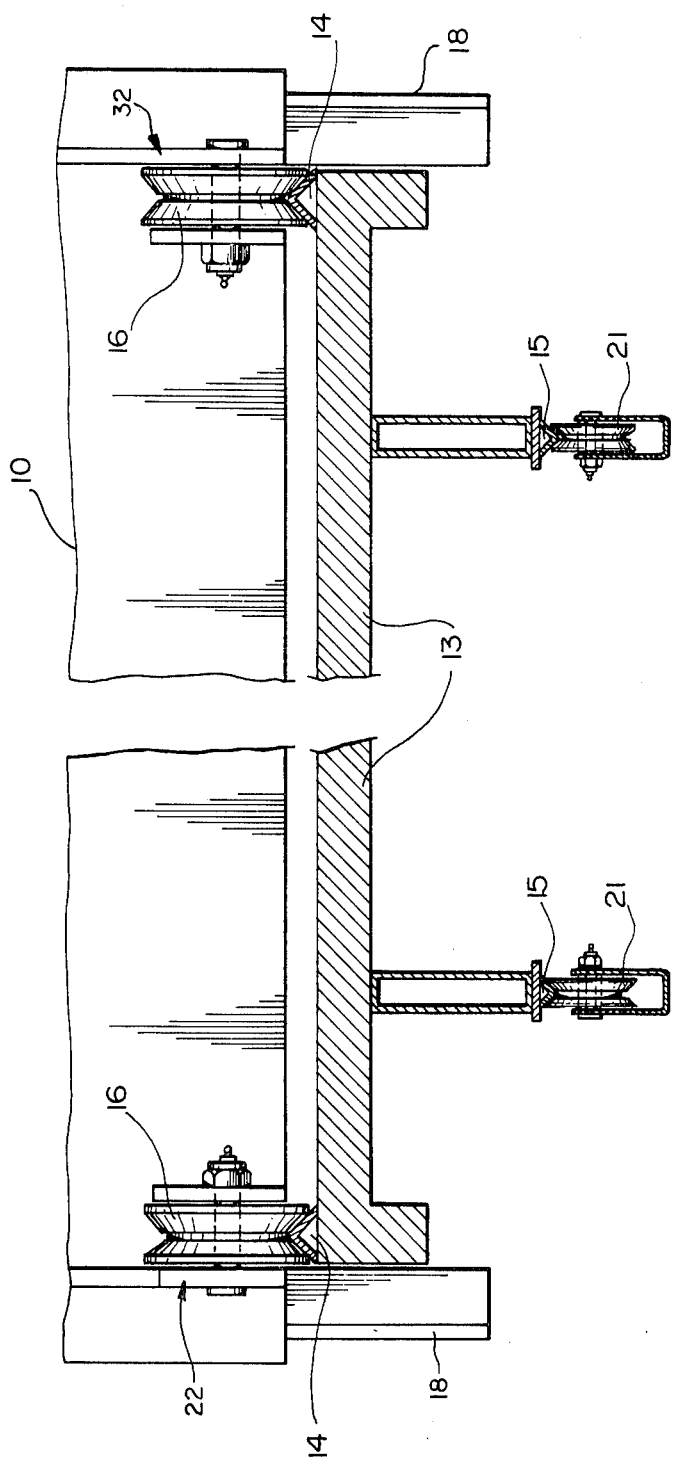
FIG. 3 is a broken cross-section showing the detail of the carriage guiderails and rollers and of the container guiderails and rollers.

The illustrated embodiment of the invention comprises a flat bed trailer consisting of a goose-neck 11 or a tongue tiltably attachable to a tractor or other hauling unit 12 (not completely shown), a flat bed platform or trailer bed 13 provided on its upper surface with at least two longitudinal container guiderails or tracks 14 and, on its lower surface with at least two longitudinal carriage guiderails or tracks 15. A load such as container 10, or a pallet, is provided with rollers 16 which are rotatably supported by forwardly projecting brackets 32, and which engage the container guiderails or tracks 14, and with a set of angled alignment plates 18 fixed to the lower forward part of the container or pallet and below the outboard side of bracket 32. The alignment plates engage the sides of the platform 13 thus assuring that the load is drawn onto the trailer bed in a proper alignment and orientation so that the container rollers 16 properly engage the container guiderails 14. The wheel carriage assembly 20 is provided with V-rollers 21 which engage the carriage guiderails or tracks 15. A winch 30, which may be affixed to the platform 13 or to the hauling unit 12, but which in the illustrated embodiment is affixed to the platform 13 and is driven from the tractor drive through a power take-off 29, engages a winch cable 31 which cable can be connected either to the lower edge of the container or pallet or to the forward part of the said wheel carriage assembly. A linkage cable 33, the purpose of which is to interconnect the container or pallet and the wheel carriage assembly so that winch induced movement of one will result in a corresponding movement of the other, is connected at one end to the forward lower edge of the container or pallet, while the other end is connected to the rear part of the wheel carriage assembly, and runs through an idler retractor sheave 34 located at the rear of the flat bed trailer. It will be appreciated that the guiderails or tracks 15 and the rollers 16 need not be used, although their use greatly facilitates the movement of the load over the trailer bed.

According to the illustrated embodiment, the flat bed trailer of FIG. 1 may be unloaded by pulling the wheel carriage assembly of the tiltable trailer forward by means of the winch and the winch cable attached to the forward part of the undercarriage thus permitting the trailer to tilt rearwardly about the wheel carriage which acts as a fulcrum, and simultaneously pulling the load rearward and off the tilting trailer bed by means of the linkage cable running through the sheave at the rear of the trailer bed, one end of which cable is attached to the rear part of the said undercarriage, while the other end is attached to the forward lower part of the load. In practice, a loaded tractor trailer unit may be unloaded onto a relatively low loading platform or dock by backing the unit up against the loading platform or dock, or it may be unloaded onto level ground without uncoupling the trailer from the hauling unit. The cable leading from the winch is attached at its free end to the forward part of the slidable wheel carriage. The linkage cable is attached at one end to the rear part of the undercarriage, run through a retractor sheave at the rear of the trailer bed and attached at its other end to the forward lower edge of the load. When the winch is actuated, the wheel carriage is pulled forward along the longitudinal guiderails on the lower surface of the trailer bed while the load, which is equipped with rollers engaging the longitudinal guiderails on the upper surface of the trailer bed, is pulled rearward at a speed equal but opposite in direction to that of the wheel carriage as a result of the interconnection of the wheel carriage and the load through linkage cable 33. As a result, the wheel carriage, which acts as a fulcrum for the trailer bed 13, and the load simultaneously move at the same rate in opposite directions, and the trailer bed tilts rearwardly in a controlled manner while the load slides off the trailer bed onto a loading platform or dock, or onto the ground. When the greater part of the load, preferably almost the whole length of the container or pallet, has cleared the trailer bed and is resting on the loading platform or dock, or on the ground, the winch is stopped, the linkage cable disconnected from the container, the wheel carriage locked to the lower surface of the trailer bed in a known manner, and the trailer is then pulled in its tilted position from under the remainder of the load. Where it is desirable to delay the commencement of the movement of the load until the wheel carriage has been drawn partly forward and the trailer bed has tilted somewhat, a linkage cable with a desired amount of slack is employed.

After unloading, the trailer may be returned to its normal horizontal position either by unlocking the wheel carriage and braking or locking the wheels of the wheel carriage and moving the trailer slowly in the forward direction, or by passing the winch cable through the idler reactor sheave, attaching the winch cable to the rear part of the wheel carriage, unlocking the wheel carriage, and actuating the winch. The wheel carriage is then pulled rearward to its normal hauling position and the trailer bed returned simultaneously to its horizontal position. The wheel carriage then may be locked to the trailer bed and the trailer is thus returned to its normal running position. It will be observed that the idler sheave, referred to as "retractor sheave" is instrumental in retracting the load when the wheel carriage assembly is pulled forward and in retracting the wheel carriage assembly when the load is pulled forward and onto the trailer.

Loading of such loads as containers, pallets, etc. onto the illustrated flat bed trailer is performed according to a method consisting of the following steps. The trailer bed of the flat bed trailer of this invention is tilted rearwardly either by unlocking the wheel carriage and braking or locking the wheels of the wheel carriage and backing up slowly with the trailer, or by unlocking the wheel carriage and pulling it forward by means of the winch, in which case the winch cable is attached directly to the forward part of the slidable wheel carriage. The trailer bed in its tilted position provides a ramp which greatly facilitates loading. Loading of cargo such as containers, pallets, etc. is achieved by positioning the ramped trailer in front of the load, attaching the winch cable to the lower forward edge of the container and connecting the lower forward edge of the container and the rear part of the undercarriage by the linkage cable guided by the idler sheave at the rear of the trailer bed. The operation of the winch causes the container to move forward while the wheel carriage starts to be drawn rearward. When the front of the container reaches the rear of the tilted trailer bed, the alignment plates at the lower forward edge of the container engage the sides of the trailer bed to center the container with respect to the trailer bed and ensure that the position of the container rollers on the bottom of the containers properly matches the position of the container guiderails or tracks. The container, moving on its rollers over the container guiderails or tracks of the trailer bed, is then drawn the length of the trailer bed to its proper hauling position, while the wheel carriage, which is connected to the container by means of the linkage cable, is simultaneously drawn rearward, smoothly returning the trailer into its horizontal position. The employment of a linkage cable of proper length assures that the synchronous loading movement of the container and the wheel carriage bring the entire container-trailer assembly into its proper running position. The container and the wheel carriage may then be secured or locked in position and the loaded trailer is ready to be transported. As will appear from FIG. 2 of the drawings, the container may be provided with legs or supports along its lower lateral extremities to provide a clearance between the container bottom and the ground or supporting surface, if desired. These supports will be spaced apart a distance slightly greater than the width of the flat bed as they will overhang the sides of the flat bed when the load is installed.

What I claim as my invention is:

1. In a flat bed trailer tiltably attachable to a hauling unit, comprising a flat bed platform provided, on its lower surface, with at least two longitudinal carriage guiderails, a movable wheel carriage assembly provided with rollers which engage the said carriage guiderails, the improvement which comprises: (1) a winch; (2) a winch cable engaged by the said winch and capable of being selectively connected to the forward lower edge of a load or to the forward part of the said wheel carriage assembly; (3) a linkage cable, one end of which is capable of being connected to the forward lower edge of the load, while the other end is capable of being connected to the rear part of the said wheel carriage assembly; (4) an idler sheave located at the rear of the said flat bed trailer, adapted to accept and guide said linkage cable.

2. A flat bed trailer of claim 1 wherein the said flat bed platform is provided, on its upper surface, with at least two longitudinal load guiderails adapted to be engaged by and to guide rollers affixed to the said load.

3. A flat bed trailer of claim 2 wherein the said load is a container or pallet which is provided at its bottom surface with at least two sets of rollers, the said sets being separated by a distance equal to the distance between the load guiderails; the rollers of said sets being capable of engaging and moving along the said load guiderails.

4. A flat bed trailer of claim 3 wherein said container or pallet is provided with vertically disposed alignment plates projecting forwardly from the lower lateral extremities of the forward face of the load and adapted to facilitate the alignment of the load with respect to said flat bed platform.

5. A flat bed trailer of claim 1 wherein the said winch is affixed to said flat bed platform.

6. A flat bed trailer of claim 5 wherein the said winch is driven by the power of the said hauling unit.

7. A flat bed trailer of claim 1 wherein the said load is provided along its lower lateral edges with vertical supports capable of supporting the weight of the load and maintaining the lower surface of the said load at a clearance above level ground.

8. A flat bed trailer of claim 7 wherein the transverse distance between said supports, is slightly greater than the maximum transverse dimension of the flat bed platform of the flat bed trailer.

9. A method of loading containers, pallets and similar loads onto flat bed trailers having a wheel carriage which is mounted for sliding movement in the direction of movement of the trailer, comprising the steps of aligning the rear end of a trailer with the front end of the load, tilting the trailer bed downwardly at the rear by drawing the wheel carriage in the forward direction, attaching one end of a linkage cable to the rear part of said slidably mounted wheel carriage and attaching the other end of the said linkage cable to the lower forward part of said load, attaching a winch cable to the lower forward part of the said load, pulling the said load forward and onto the tilted trailer bed by means of said winch cable while simultaneously drawing said wheel carriage rearward by means of the said linkage cable.

10. The method of claim 9 wherein where the said linkage cable is guided through a sheave at the rear end of the said trailer bed.

11. A method of unloading of containers, pallets or similar loads from flat bed trailers having a wheel carriage which is mounted for sliding movement in the direction of movement of the trailer, comprising the steps of attaching a winch cable to the forward part of the wheel carriage, attaching one end of a linkage cable to the rear part of said wheel carriage and attaching the other end of the said linkage cable to the forward lower part of a load, drawing said wheel carriage forward by means of said winch cable, while said load is simultaneously drawn downwardly at the rear by means of the said linkage cable, resulting in said trailer bed being tilted rearward and said load sliding and being drawn off the said trailer bed and, after a part of the said load comes into contact with and to rest off the trailer bed on a load bearing surface, disconnecting said linkage cable and driving the tilted flat bed trailer forward and from under the remainder of the said load.

12. The method of claim 11, wherein said linkage cable is guided through a sheave at the rear end of said trailer bed.

13. A method of loading of a load onto a tiltable flat bed trailer provided with a wheel carriage assembly which is mounted for sliding movement relative to the bed in the direction of travel of the trailer, and a single power means connectable to said wheel carriage assembly and said load, said method consisting of operating said power means drawing the said load forward and onto said trailer when it is tilted downwardly at the rear and, simultaneously, drawing said wheel carriage assembly rearward thus returning the said trailer to a horizontal position.

14. A method of unloading a load from a tiltable flat bed trailer provided with a wheel carriage assembly which is mounted for sliding movement relative to the bed in the direction of travel of the trailer and a single power means connectable to said wheel carriage assembly and said load, which method consists of operating said power means thus drawing the wheel carriage forward thus tilting the said flat bed trailer rearward, while, simultaneously, drawing said load rearwards and off said trailer.

15. The method of claim 14 wherein the said wheel carriage is drawn forward by means of a winch-driven cable.

* * * * *